United States Patent

Ward

[11] Patent Number: 5,996,406
[45] Date of Patent: Dec. 7, 1999

[54] ADVANCED SIGNAL PROCESS FOR A MATERIAL STORAGE MEASURING DEVICE

[75] Inventor: Richard Larry Ward, Chandler, Ariz.

[73] Assignee: Motorola, Inc., Schaumburg, Ill.

[21] Appl. No.: 08/859,064

[22] Filed: May 20, 1997

[51] Int. Cl.$^6$ ........................................................ G01F 23/00
[52] U.S. Cl. ................................................................. 73/290 R
[58] Field of Search ........................ 73/290 R; 342/124, 342/145

[56] References Cited

U.S. PATENT DOCUMENTS

| | | | |
|---|---|---|---|
| 4,665,403 | 5/1987 | Edvardsson | 342/124 |
| 4,905,207 | 2/1990 | Fellinger et al. | 367/99 |
| 5,406,842 | 4/1995 | Locke | 73/290 R |
| 5,440,310 | 8/1995 | Schreiner | 342/124 |

OTHER PUBLICATIONS

James A. Cadzow, Senior Member, IEEE, "Spectral Estimation: An Overdetermined Rational Model Equation Approach", Proceedings of the IEEE, vol. 70, No. 9, Sep. 1982.

John M. M. Anderson, Georgios B. Giannakis, and Ananthram Swami, Members of the IEEE, "Harmonic Retrieval Using Higher Order Statistics: A Deterministic Formulation", IEEE Transactions on Signal Processing, vol. 43, No. 8, Aug. 1995.

Primary Examiner—Harshad Patel
Assistant Examiner—Robin Clark
Attorney, Agent, or Firm—Gregory Gorrie; Bradley J. Botsch

[57] ABSTRACT

An advanced signal processing technique accurately discriminates and estimates a small sinusoidal signal in close proximity from one or more large sinusoidal signals. The technique involves using digital processing techniques to accurately estimate the frequency (96), amplitude (94) and phase (98) of the one or more large sinusoids and then using this estimate to obtain an accurate estimate of the small sinusoidal signal by subtracting the large sinusoid from the data to obtain a residual and reprocessing the residual.

4 Claims, 2 Drawing Sheets

ADVANCED SIGNAL PROCESS FOR A MATERIAL STORAGE MEASURING DEVICE

BACKGROUND OF THE INVENTION

This invention relates to material storage measuring devices and, in particular, to an advanced signal processing technique for accurately measuring the depth of a low dielectric material in a storage device.

Generally, a material monitoring device is a device which is intended to view the contents of a storage tank from above and report the distance to the top surface of what ever is stored in the tank. The device does this by, for example, measuring or estimating the frequency difference between transmitted and the received signals, which is proportional to the distance to the reflecting surface. In a correctly designed device, the situation is such that the difference frequency (IF) signal is either a sum of sinusoids or a sum of sinusoid modulated by the modulation signal.

However, several problems are associated with estimating the frequency which corresponds to the reflecting surface of interest. First and most foremost, if the material to be monitored is non-conducting and has a low dielectric constant, then the RF energy can penetrate the fluid and be reflected from whatever is below the surface of interest that is opaque to the RF signal. This could be the bottom of the tank, or it could be some other fluid (such as water for example) that is opaque to the RF signal. This results in a target which complicates the process of estimating the frequency of interest. To make matters worse, the RF power returned from the surface of interest can be as much as 30 dB less than that returned from the bottom of the tank. Accordingly, the signal of interest is much smaller than other returned signals. To make matters still worse, as the surface of the dielectric fluid approaches the bottom of the tank, the frequencies of the sinusoids resulting from these targets tend to converge, and can become very close. This is the so called "low dielectric problem" that has plagued material monitoring device vendors since the inception of such devices.

Second, if the modulation waveform is repetitive and the IF signal is observed over more than one cycle of the modulation, special processing must be done to separate the information bearing sinusoid from the harmonics of the modulation.

Third, there may be reflections from objects in the tank other than the reflecting surface of interest. These reflections contribute to the IF signal and must be appropriately dealt with in the process of estimating the distance to the surface of interest.

Fourth, the users of material monitoring devices require very accurate estimates of the distance to the surface of interest. This implies that the parameters of the modulation signal must be precisely known, and the estimate of the frequency of the sinusoid of interest must be precise.

Fifth, the Federal Communications Commission (FCC) requires that the RF signal radiated from devices intended for this application be limited both in power and bandwidth. The power limitation limits the signal to noise ratio that can be obtained in the IF signal. The band width limitation is the more severe handicap, and, in fact, the material monitoring devices sold by most vendors do not adhere to the FCC frequency limits, which means that the users of these devices must apply for a license that is specific to the site at which the device is to be used.

Hence, there exists a need for an improved technique for measuring the depth of a low dielectric material in a storage tank while not suffering from the problems discussed above.

DETAILED DESCRIPTION OF THE DRAWINGS

The present invention provides an improved signal processing to technique for processing the IF signal of a material monitoring device to obtain very accurate estimates of the frequencies of interest, so that the distance to the target of interest, i.e., the surface of a low dielectric material, may be accurately computed.

Figure 1:
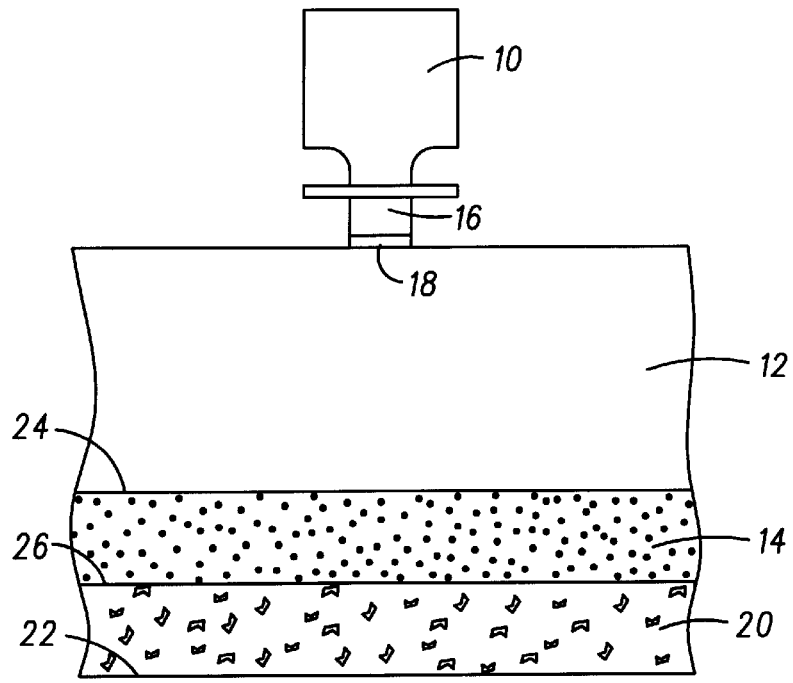
FIG. 1 is a pictorial diagram illustrating a material monitoring device attached to a storage tank for measuring the level of a material therein.

Referring to FIG. 1, a pictorial diagram illustrating material monitoring device 10 attached to a storage tank 12 for measuring the level of material 14 therein. Device 10 is typically coupled to storage tank 12 via standpipe 16 whereby RF signals are transferred between apparatus 10 and storage tank 12 via glass 18. Storage tank 12 includes surface 22, which represents the bottom surface of tank 12, that represents an RF opaque surface. Alternately, tank 12 may also include material 20, for example, water, that is opaque and, thus, reflects RF signals.

Briefly, when an RF signal is transmitted from apparatus 10 into tank 12, it will first reach low dielectric interface 24 which causes a small reflection of the RF signal whereby much of the RF signal is still transmitted through material 14. This RF signal will then eventually reach RF opaque interface 26 (or bottom surface 22 if material 20 is not present) and this will reflect most of the RF signal back to device 10. As discussed above, the problem faced with the present invention is to be able to distinguish the sinusoid signals being reflected from surface 24 of material 14 and surface 22 of the bottom of the tank (or surface 26 of material 20, if present) whereby typically the signal of interest is the one being reflected from interface 24, but this signal is typically much smaller than the being reflected from the RF opaque interface. It is this signal reflected from surface 24 will allow one to determine the level of material 14 within tank 14.

Figure 2:
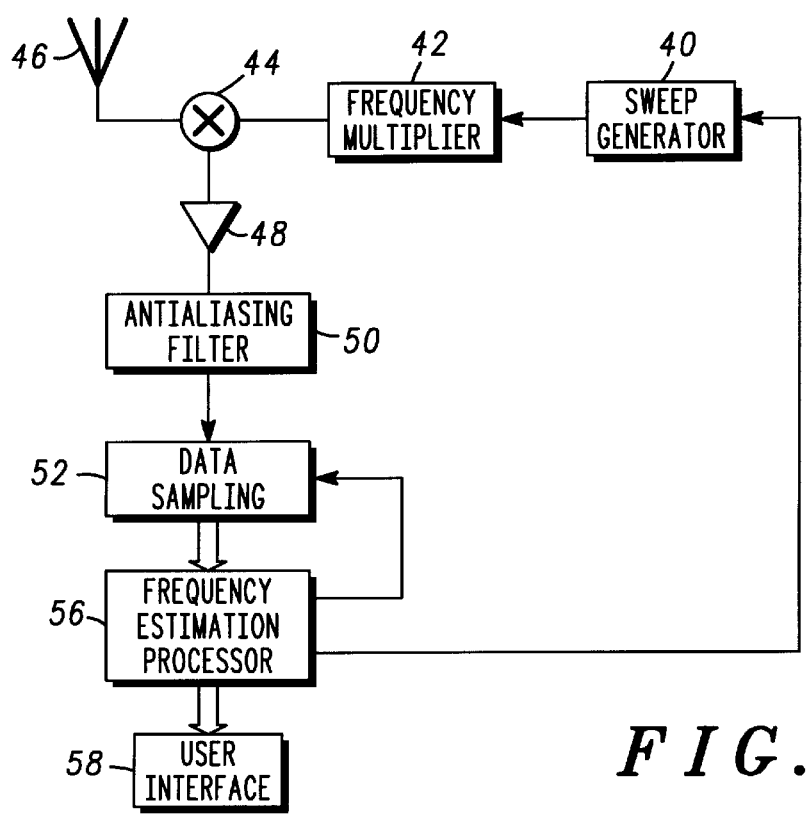
FIG. 2 is a block diagram illustrating the components of the material monitoring device in accordance with the present invention.

Referring now to FIG. 2, a block diagram illustrating the components of material monitoring device 10 is shown. FIG. 2 includes sweep generator 40 for generating a predetermined linear change in frequency versus time over a predetermined frequency range, for example, a 250 Megahertz frequency range.

The output of sweep generator 40 is coupled to frequency multiplier 42 for upconverting the swept frequency to a predetermined frequency, for example, 24.5 gigahertz. It is worth noting that the frequency range of sweep generator 40 and the up conversion function performed by frequency multiplier 42 are not limited to the value set forth above. Rather, it is understood that the frequency range of sweep generator 40 and the upconversion performed by frequency multiplier 42 may be any convenient value. However, the preferred embodiment upconverts to a 24.5 gigahertz frequency, for example, so as to maintain a small diameter antenna which is suitable in the material monitoring device application.

The output of frequency multiplier 42 supplies one input to mixer 44 whereby the second input to mixer 46 comprises the return signal from within storage tank 12. The output of mixer 44 represents a baseband return signal and is provided as an input to low noise amplifier 48.

The output of low noise amplifier 48 is coupled to an input of antialiasing aliasing filter 50 which is necessary for all digital processing techniques.

The output of filter 50 is provided to an input of data sampling/analog to digital converter (ADC) 52, the output of which is supplied to frequency estimation processor 56.

Processor 56 may take the form of a microprocessor, for example, a Motorola power PC 603 or 604 processor, for processing the data samples from data sampling device 52 and for providing a frequency estimation of the data samples. Processor 56 also provides control signals to data sampling device 52 and to sweep generator 40 for controlling the ramping of the sweep frequency.

The output of processor 56 provides both an estimation of sinusoidal signals contained within the data samples as well as an estimation of the level of material 14 within the storage tank. This output is also provided to a suitable user interface 58, such as a liquid crystal display or the like.

Figure 3:
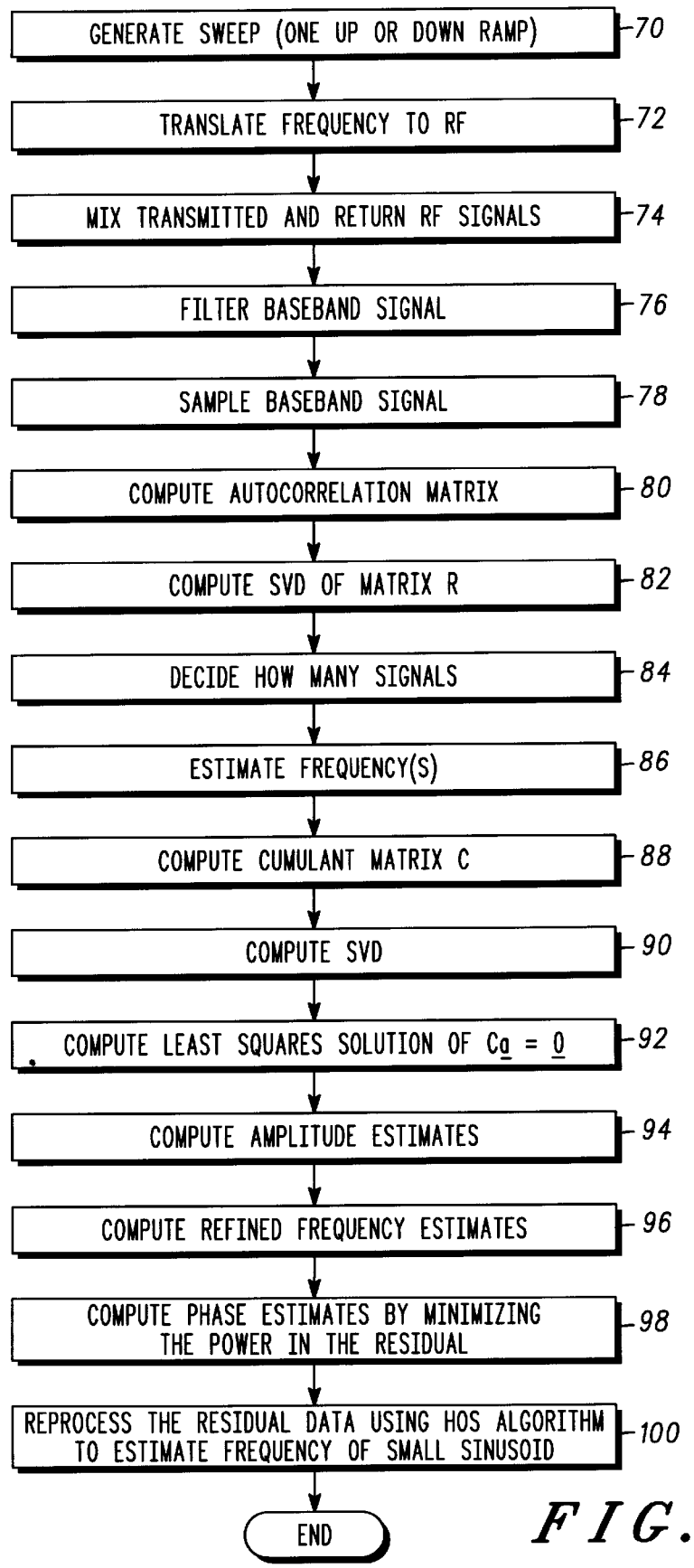
FIG. 3 are detailed flow charts illustrating the steps performed by the material monitoring device, including the advanced signal processing, for accurately measuring the level of the material in the storage tank in accordance with the present invention.

Processor 56 includes software embedded therein for performing advanced signal processing functions for estimating the frequency of the data samples. Referring now to FIGS. 3A and 3B, detailed flowcharts illustrating the steps performed by the material monitoring device 10, including those steps performed by the advanced signal processing, are shown. The first step is to generate a sweep frequency whereby only one up or one down ramp cycle is generated, as represented by box 70. Accordingly, by generating only one up or down ramp, problems associated with modulation of the IF signal by the modulation waveform, such as those associated with commonly known sawtooth and triangle function waveforms, are obviated.

The next step is to translate this swept frequency to an RF signal, for example, 24.5 gigahertz as in the preferred embodiment, as represented by box 72.

The RF signal is both transmitted and mixed with the return RF signal from within storage tank 12, as represented by box 74.

The mixed signal which now represents a baseband signal is filtered in preparation for digital sampling, as represented by box 76.

The baseband signal is sampled and digitized, as represented by box 78.

Now, in accordance with the present invention, an advanced signal processing technique is performed on these data samples so as to accurately determine the frequencies, amplitudes and phases of the sinusoids of the return signal whereby these sinusoids represent reflections of the transmitted signal caused by reflections due to low dielectric interface 24 and opaque interface 22 and/or 26. As previously mentioned above, typically the reflected signal due to low dielectric interface 24 (the one of interest) is much smaller than reflective signal due to opaque interface 26 and/or 22. However, in order to accurately estimate the level of the material in storage tank 12, one must accurately determine the frequency due to the reflection of low dielectric interface 24 which means that signal processing techniques must be performed in order to distinguish between the different sinusoids due to the reflective signals.

The software algorithm of the present invention is a combination of and an extension of two spectral estimation algorithms which have been described in the technical literature. The combining of the algorithms was done to make the overall algorithm sufficiently flexible to effectively solve the problems of the prior art. The extending of the algorithms was done specifically to solve the low dielectric problem mentioned above wherein a low dielectric material surface generates only a small reflected RF signal relative to the reflected signal from an opaque RF surface such as the bottom of the storage tank.

Moreover, the present invention recognizes that if the signal is observed (sampled) only during one half of a frequency modulation cycle in the case of a triangle wave, or during one cycle in the case of a saw tooth, then the modulation signal is essentially "out of the picture" so long as the frequency versus time ramp is sufficiently linear. This is because now the signals that result from the reflecting objects seen by the device are seen as pure sinusoids, uncorrupted by the modulation signal. Accordingly, the technique described herein is intended to be used on data taken only during a single modulation sweep. The down side of only sampling the IF signal during a single modulation sweep is that only a relatively few data samples can be applied to the task of spectral estimation, but both of the algorithms combined here were intended to yield accurate estimates of the frequencies of the sinusoids in a signal when the data consists of only a few tens of signal samples. Contrast this with the case of the discrete Fourier transform (DFT) in which the frequency resolution obtained is directly proportional to the number of data samples used. In fact, if one were to apply the DFT to this problem, many thousands, (perhaps even tens of thousands) of signal samples would be needed to get sufficient frequency estimation accuracy.

As was stated previously, the algorithm being described here is a combination and extension of two high resolution spectral estimation algorithms which have been described in the technical literature. These algorithms are referred to hereafter as the autocorrelation and the higher order statistics (HOS) algorithms. Descriptions of these algorithms are found in the references: James A. Cadzow, "Spectral estimation: An overdetermined rational model equation approach", Proc. IEEE, vol. 70, pp. 907–939, September 1982 (the Cadzow reference), and Anderson, Giannakis, and Swami, "Harmonic retrieval using higher order statistics: A deterministic formulation", IEEE Trans. Signal Processing, vol. 43, pp. 1880–1889, August 1995 (the Anderson reference), respectively, the subject matter of which is incorporated by reference herein.

Both of these algorithms are based on the idea of modeling the observed (sampled) signal as though it had been produced by driving a linear, time invariant, casual system, (filter) by a white noise process, and observing the output. It is well known that in this case the power spectral density function (PSDF) of the resulting signal is simply the magnitude squared of the filter transfer function. This holds true whether we are talking about a continuous time system in which the Laplace transform transfer function is used, or we are talking about a sampled data system in which the Z transform transfer function is used. Obviously, there is a large number of classes of filters which might be used as the basis for a signal model. In fact, all of the possible classes of linear, time invariant, causal filters have been used as a basis for signal model based spectral estimation. In our case, the class of filters is restricted to those whose transfer functions only have poles and no zeros, as opposed to those which might have only zeros or both poles and zeros. In the case of the autocorrelation based algorithm, the signal is assumed to be a sum of sinusoids in white gaussian noise. In the case of the HOS algorithm, the signal is again assumed to be a sum of sinusoids in additive gaussian noise, but in this case the noise need not be assumed to be white. In both cases, the sum of sinusoids is assumed to have been produced by driving a filter with a white noise process. The noise in the observed signal is modeled as having been added after the output of the filter. Obviously, if the observed signal samples can be processed in such a way that the parameters (poles) of the underlying filter can be estimated, or learned, then we also have knowledge of the power spectral density function (PSDF) of the signal, which is the end object of any spectral estimation procedure. This is precisely what is done by both of the algorithms.

Consider the case of a sampled data filter that has an all pole transfer function and is driven by white noise. In this case, the transfer function of the filter takes the form b/f(z), where b is a constant, and f(z) is a rational polynomial in powers of the Z transform variable z. Such a system obeys a difference equation of the form $$\sum_{i=0}^{p} a_i y(n-i) = x(n),$$

where y(n) is the current sample of the output, x(n) is the current input sample, and the constant b has been taken to be 1. Since this equation can also be written in the form $$y(n) = -\sum_{i=1}^{p} a_i y(n-i) + x(n)$$

it follows that $a_0$ must be constrained to be unity in any solution. The transfer function of the system that obeys this difference equation is given by $$\frac{Y(z)}{X(z)} = \frac{1}{\sum_{i=0}^{p} a_i z^{-i}}.$$

Obviously, if one can learn the values of the polynomial coefficients $a_i$ by processing the data samples, the goal of determining the spectrum of the signal will have been achieved. Moreover, in the case of a sum of sinusoids, the frequencies of the sinusoids can be obtained directly by computing the complex roots of the polynomial. This idea is fundamental to both of the algorithms referenced above.

Referring back to the difference equation above, if one were to multiply on both sides of this equation by one of the samples of the filter output, say $y(n-\tau)$, the expression $$\sum_{i=0}^{p} a_i y(n-i) y(n-\tau) = x(n) y(n-\tau)$$

is achieved. Now, take expected values (E[.]) on both sides and the following expression is obtained which refers back to FIG. 3a of computing the autocorrelation matrix as represented by box 80.

$$\sum_{i=0}^{p} a_i E[y(n-i)y(n-\tau)] = E[x(n)y(n-\tau)]. \qquad \text{EQN. 1}$$

-continued $$\text{Now, } E[y(n-i)y(n-\tau)] = R(\tau - I)$$

where R(n) is the autocorrelation of the signal at lag n.

Moreover, $E[x(n)y(n-\tau)]=0$, since x(n) is assumed to be white, and uncorrelated with everything. Therefore, one can think about an equation of the form $$\sum_{i=0}^{p_e} a_i R(\tau - i) = 0.$$

Further, by changing the value of $\tau$ in this equation, one can write an arbitrary number of equations of this form, involving the autocorrelation lags of the observed signal, and the desired polynomial coefficients. That is, one can write a system of equations of the form $$R\underline{a}=0 \qquad \text{EQN.2}$$

where R is a matrix whose elements are autocorrelation lags; and $\underline{a}$ is a vector whose components are the desired coefficients.

These equations are known as Yule-Walker equations. A little thought will convince one that if $\tau$ is increased (or decreased) by one to create each successive equation, the matrix R will be toeplitz. Also, since the elements of the matrix R are autocorrelation lags, it should be obvious that we are talking about the algorithm of the Cadzow reference. Unfortunately, we do not usually have knowledge of the autocorrelation lags of the signal, so they must be estimated form the data. This can be easily done by computing sample means.

Now, we have the question of the dimensions of the matrix R. If the number of sinusoids in the data is known, then the number of columns of R can be determined, since there should be two poles in our signal model filter for each sinusoid. This means that the parameter p should be set to 2n+1, where n is the number of sinusoids. It quite often turns out that the number of sinusoids is not known apriori, however, and must be determined as part of the process of estimating the spectrum. This parameter has been set to $p_e$ in the last equation to reflect the fact that we may wish to choose a larger than probable value for the dimension of $\underline{a}$. The Cadzow reference advocates over-determining the problem, both in terms of the number of possible sinusoids, (poles) but also in terms of the number of equations, so that a matrix R with both more columns and more rows than need be results.

The next step is to compute the singular value decomposition (SVD) of the matrix R, as represented by box 82. We have the equation $R\underline{a}=0$, in which the matrix R has been estimated from the data (signal samples). We wish to compute a minimum 2 norm solution of this equation for the vector $\underline{a}$. We could do this by using the Moore-Penrose pseudo inverse of R. One of the steps to computing a solution for $\underline{a}$ is to compute the singular value decomposition, (SVD) of R. The SVD takes the form $R=U\Sigma V^T$, where $R \in \mathbb{R}^{m \times n}$ and U and V are mxm and nxn unitary matrices, respectfully, and $\Sigma=\text{diag}(\sigma_1, \sigma_2, \ldots, \sigma_n)$, where the $\sigma$'s are the singular values, usually arranged in order of decreasing value. Now, suppose that the parameter p has been chosen to be larger than one more than twice the number of sinusoids in the signal, so that the number of columns of R is greater than need be. This implies that some of the components of the vector a should be zero. It also implies that the matrix R cannot have full rank, and that some of the singular values should be zero. Practically, since we only have estimates of the autocorrelation lags, none of the singular values will probably ever be zero, but some set of them will be much smaller than the others. Therefore, the algorithm of the Cadzow reference affords a means of determining the number of sinusoids in the data by inspecting the singular values of R, as represented by box 84. This means that the algorithm of the Cadzow reference may be used to determine the number of reflectors seen by device 10, which is a useful piece of information by its own right, and also aids the estimation of the frequencies of sinusoids by the algorithm described in the Anderson reference.

If the matrix R does not have full rank, the dimension of its null space is at least one. For reasons that will not be discussed herein, the null space of R has come to be known as the noise subspace, and its range space has come to be known as the signal subspace. As was mentioned above, the pseudo inverse can be used to compute an estimate of the vector a. The Cadzow reference advocates computing a as a linear combination of the right singular vectors that correspond to the $p_e-p$ smallest singular values, and therefore belong to the noise subspace. Specifically, a is computed as:

$$\underline{a} = \frac{\sum_{k=p+1}^{p_e} v_k(1)\underline{v_k}}{\sum_{k=p+1}^{p_e} v_k(1)^2} \quad \text{EQN. 3}$$

where $v_k(1)$ is the first component of the kth column of the unitary matrix V.

Once the vector a is known, the transfer function of the signal model filter is also known. As was stated above, the PSDF of the signal can be computed by computing the absolute value squared of the transfer function as a function of frequency. If this is done, a large narrow peak will be found at the frequency of a sinusoid whereby the frequencies may be estimated pursuant to step 86. Very accurate estimates of the frequencies of the sinusoids in the data can be obtained by finding those frequencies at which the PSDF is maximum. In our algorithm, this is done by performing a linear search in the neighborhood of peaks found by computing the PSDF at a relatively few equally spaced frequencies. Because of the transmitted bandwidth limitation imposed by the FCC, modulation ramp slopes must be chosen such that only about one cycle of the sinusoid due to a target close to the antenna may be sampled during a single modulation ramp sweep. In this situation, the return from the dielectric fluid surface is much greater than that from the bottom of the tank, even in the low dielectric case. In this case the autocorrelation algorithm and its extension provides a much more accurate estimate of the sinusoid frequency than does the HOS algorithm. This and the fact that the number of sinusoids is readily estimated by the algorithm described in the Cadzow reference means that the inclusion of this algorithm in the overall algorithm to estimate target frequencies is significant. Accordingly, by using the technique described in the Cadzow reference, one may accurately determine the frequencies of the reflected sinusoids.

However, the teachings of the Cadzow reference is limited. In the absence of any other competing reflections, the PSDF of the IF signal for this case, in the domain of positive frequencies should be a pair of impulse functions located at the frequencies which correspond to the target distances. Since our frequency estimation strategy calls for estimating the locations of PSDF maxima, the algorithm works fine so long as there is sufficient distance between peaks. The problem is that a plot of the PSDF obtained using the Cadzow algorithm has two distinct peaks, but has positive values at frequencies removed from the peaks. In other words, because perfect knowledge of the autocorrelation lags is unobtainable, the PSDF looks like what one would expect to see if a rubber sheet were streched over two projecting peaks, as opposed to a pair of impulse functions. That is, the impulse functions are seen to have skirts which extend away from the locations of the peaks. As the surface of the dielectric material approaches the bottom of the tank, the peak due to the small sinusoid moves into the region of the skirt of the peak due to the larger sinusoid. As the frequencies get sufficiently close, the peak due to the smaller sinsoid tends to be swallowed up by the skirt of the larger one. In fact, the singular values of the autocorrelation matrix due to this sinusoid approach those due to the noise, etc. Therefore, the algorithm is unable to adequately recognize the existance of the smaller sinusoid in this case. This means that the Cadzow algorithm by itself does not suffice to estimate the distance to the surface of the dielectric material, if the two surfaces are sufficiently close to one another. This does not effect the accuracy of the estimate of the frequency of the larger sinusoid, however, and the Cadzow algorithm always yields very accurate estimates of the frequency of the larger sinusoid. (In the material storage application, this fact may be used for autocalibration, if the distance to the bottom of the tank is accurately known.)

As was stated earlier, the algorithm described in the Anderson reference is referred to as the higher order statistics, (HOS) algorithm. This is because it is based on the idea of estimating forth order statistics of the data called cumulants instead of using the autocorrelation lags which are second order statistics. Another major difference between the two algorithms is that the algorithm described in the Anderson reference assumes apriori knowledge of the number of sinusoids in the data. This is not a problem here, because the algorithm of the Cadzow reference provides a means to determine the number of sinusoids, as discussed in detail above. Also, the Anderson algorithm is specifically intended to be used to estimate the frequencies of sinusoids (harmonic retrieval), whereas the Cadzow algorithm is not necessarily so restricted.

Up to a point, the derivation (justification) of the Anderson algorithm follows exactly that of the Cadzow algorithm, since one can multiply on both sides of the above-mentioned difference equation by the appropriate combination of delayed samples of y(n) to produce forth order diagonal slice cumulants when expected values are taken on both sides. Therefore, the cummulant matrix may be computed, as represented by box 88, the SVD of matrix C may also be computed, as represented by box 90, and the least squares solution of Ca=0 may also be performed, as represented by box 92. In a similar manner as was described above with respect to the R matrix, a set of Yule-Walker equations involving cumulants may be written in the form Ca=0 in which the elements of the matrix C are forth order diagonal slice cumulants which are computed from the data by:

$$\overline{C_{4y}}(\tau) = E[y(n)y(n+\tau)y(n+\tau)y(n+\tau)] - 3E[y(n)y(n)]E[y(n)y(n+\tau)] \quad \text{EQN. 4}$$

where E[.] denotes the process of taking the expected value, which is again computed from the data by computing sample means.

Now, E[y(n)y(n)]=R(0), the value of the autocorrelation at lag 0, and E[y(n)y(n+τ)]=R(τ), value of the autocorrelation at lag τ. Again, the set of Yule-Walker equations is built up by choosing successively larger values of lag τ, starting at zero. Again, an arbitrary number of equations (within reason) can be written. Therefore, we can have an equation of the form of C$\underline{a}$=0, in which C is a matrix of forth order diagonal slice cumulants. The equation set can be over-determined in the number of equations, but the number of columns of C is fixed at one more than twice the number of sinusoids, which is assumed known. Again, the object is to obtain a least squares solution for the vector $\underline{a}$, as represented by box 92, which is again the vector of coefficients of the denominator polynomial of the signal model filter transfer function. This solution is computed in exactly the same way as was done in the Cadzow algorithm, by using a linear combination of right singular vectors. Again, the solution is constrained so that the zero order coefficient is unity.

Now, we have a set of denominator polynomial coefficients. A little thought will convince one that the roots of this polynomial must occur in complex conjugate pairs, and lie on, or just inside the unit circle in the complex Z plane. A first cut estimate of the frequency of one of the sinusoids is given by the frequency which corresponds to the point at which a ray drawn from the origin through one of the roots crosses the unit circle. First cut estimates of the frequencies of the sinusoids in the data are then computed by computing the arguments (phase angles) of the roots having positive real parts.

The next step is to compute the amplitude estimates and refine the frequency estimates of the sinusoids, as represented by boxes 94 and 96, respectively. The Anderson algorithm incorporates a model fitting (cumulant matching) step to refine the initial estimates of the frequencies of the sinusoids in the data. This is in part responsible for the fact that this algorithm can produce very accurate estimates of frequencies from only a few tens of data samples. This step is based on the fact that if diagonal slice cumulants are used, the cumulants must satisfy equation 5.

$$\overline{c_{4s}}(\tau \mid \underline{\theta}) = -\frac{3}{8} \sum_{k=1}^{p} A_k^4 \cos(\omega_k \tau) \qquad \text{EQN. 5}$$

where $\overline{C_{4s}}(\tau|\underline{\theta})$ is the value of the cumulant at lag τ, given the value of the parameter vector $\underline{\theta}$, which is the vector whose components are the amplitudes and frequencies of the sinusoids.

On the right side of equation 5, the A's are sinusoid amplitudes, and the ω's are their frequencies. Diagonal slice cumulants are those in which all of the lags (except zero) in equation 4 are the same. Using equation 5 and different values of the lag τ a (possibly over-determined) set of equations whose unknowns are the forth powers of the sinusoid amplitudes can be constructed, if the previously computed frequency estimates are used for the (ω's. In the algorithm being described here, the set of equations is intentionally over-determined, and the Moore-Penrose pseudo inverse is used to compute a least squares solution for the $A_k^4$'s Now, we have preliminary estimates of the amplitudes and the frequencies of the sinusoids in the data.

The next step is to compute the phase estimates of the sinusoids which is done by minimizing the power in the residual, as represented by box 98, whereby the residual represents the processed baseband data less the estimate of the large sinusoid estimate (in frequency, amplitude and phase). Given values of the lag τ, and some trial values of sinusoid amplitudes and frequencies, the right side of equation 5 may be used to compute values of cumulants which would be expected if the trial values were correct. This fact gives rise to the cumulant matching step in which a non-linear function minimization algorithm is used to minimize the squares of differences between a set of cumulants computed using equation 5 and a set estimated from the data, by varying the assumed values of amplitude and frequency. That is, minimize the functional:

$$J_N(\underline{\theta} \mid \underline{\theta_0}) = \sum_{\tau \in R} ([\overline{c_{4s}}(\tau \mid \underline{\theta_0}) - \overline{c_{4s}}(\tau \mid \underline{\theta})])^2 \qquad \text{EQN. 6}$$

where $\underline{\theta_0}$ is the (unknown) vector of actual amplitudes and frequencies of the sinusoids in the data; and $\underline{\theta}$ is the current best estimate of $\underline{\theta_0}$.

Then, $\overline{C_{4s}}(\tau|\underline{\theta_0})$ is a cumulant estimated from the data by computing the sample mean, and $\overline{C_{4s}}(\tau|\underline{\theta})$ is the cumulant computed by using $\underline{\theta}$ in equation 5. This is a classic non-linear optimization problem. Obviously, the set of cumulant lags, (τ's) over which this is done can be arbitrarily chosen, within reason. It is best to stick with the low value lags, starting from zero, however. The vector of preliminary estimates of frequencies and amplitudes is used as a place to start the process. This step results in a refinement of the preliminary estimates of the amplitudes and frequencies of the sinusoids in the data. It is this step which enables the Anderson algorithm to produce very accurate estimates of frequencies from a very few data samples.

Now, we still have the "low dielectric" problem to solve. Simply put, the solution to this problem lies in obtaining an accurate estimate of the frequency of a low power sinusoid (the one generated by the RF signal being reflected from the low-dielectric surface), when it is accompanied by a high power one whose frequency is very close to its frequency. This is a very difficult spectral estimation problem, because the presence of the high power sinusoid tends to mask the presence of the low power one as seen by most spectral estimation approaches. The approach taken here is to basically ignore the presence of the small sinusoid, and obtain the most accurate possible estimates of the parameters of the large sinusoid, (frequency, amplitude, and phase). After this is done, a sinusoid having these parameters can be subtracted from the data, thus reducing the power of the large sinusoid, (in the residual) to the point where it no longer masks the presence of the small one. Then, the residual data can be reprocessed to obtain an accurate estimate of the frequency of the small sinusoid, as represented by box 100.

In the low dielectric situation, the small sinusoid can be safely ignored in obtaining estimates of the parameters of the large one because the power difference is so large (15 dB minimum). Therefore, the data is processed as in the description of the Anderson algorithm to obtain accurate estimates of the amplitude and frequency of the large sinusoid. Now, since the data should consist of the two sinusoids plus some additive gaussian noise (not necessarily white), it seems reasonable to suspect that removing the large sinusoid completely from the data should result in the power of the remaining signal being minimum. This is in fact the case, and it leads to a strategy for computing an optimal estimate of the phase of the large sinusoid.

Consider the functional $$P(\phi \mid \phi_0) = \sum_{n=1}^{N} [y(n) - s(n, \phi)]^2 \qquad \text{EQN. 7}$$

where y(n) is a signal sample;

s(n,φ) is the corresponding sample of a sinusoid having the previously estimated amplitude and frequency of the large sinusoid, but having a variable phase, φ; and N is the number of data samples.

This is the power in the residual samples after the large sinusoid has been subtracted. Again, this functional could be minimized by using a non-linear optimization (search) algorithm. This is precisely the same kind of optimization problem that is solved in the Anderson algorithm to refine the estimates of the amplitudes and frequencies of the sinusoids. There is one difference between this situation and that in the Anderson algorithm, however. In the Anderson algorithm, the hope is that the preliminary estimates of amplitude and frequency are close enough to the actual values that there is no chance that the optimization algorithm will seek out a local minimum as opposed to the global one. In this case however, we have no justification for choosing one phase over another as a place to start. This could result in serious trouble if the functional has multiple minima. In fact, the functional does have multiple minima, but they are spaced at multiples of 2π, and one is as good as another, so the starting phase can be arbitrarily chosen, and we are guaranteed to find a good minimum. Therefore, the above functional is minimized by varying the phase of the large sinusoid, using the same search algorithm as was used in the Anderson algorithm.

Now, we can subtract a sinusoid having the estimated parameters (amplitude, frequency and phase) of the large sinusoid from the data and reprocess the residual as was discussed above. The residual data samples are computed as x(n)=y(n)−s(n,φ̂) where φ̂ is the phase angle that minimizes the power of the residual. The residual data is reprocessed exactly as described in the Anderson algorithm, up to the point where the preliminary estimates of frequency have been computed by computing the roots of the model filter transfer function denominator polynomial. The difference between this and the processing done during the first pass through the data is that this time, the data is assumed to contain two sinusoids, whereas only one had been assumed previously. The processing is stopped after the root finding step because it turns out that the estimate of the frequency of the small sinusoid obtained at this point is more accurate than would be obtained if the steps of the Anderson algorithm were completed. In fact, the accuracy of this estimate is comparable to the accuracy to which the parameters of the large sinusoid are estimated, which is very good.

By now it should be apparent from the foregoing discussion that a novel technique has been provided for accurately discriminating and estimating a small sinusoidal signal from one or more large sinusoidal signals. The technique involves using digital processing techniques to accurately estimate the frequency, amplitude and phase of the one or more large sinusoids and then using this estimate to obtain an accurate estimate of the small sinusoidal signal by subtracting the large sinusoid from the data to obtain a residual and reprocessing the residual. Further, although the present invention has been described for use in a material storage measuring device to solve the low-dielectric problem, it should be apparent to one skilled in the art that the advanced signal processing techniques described herein may be readily applied to other applications including radar, sonar, and communications, or any other application in which an accurate estimate of the frequency of a very small sinusoid in close proximity to a much larger one is required.

I claim:

1. An apparatus for estimating a level of a material stored within a tank, comprising:

a sweep frequency generator for outputting an RF signal into said tank;

an antenna for receiving reflected RF signals;

a mixer for mixing said RF signal with said reflected RF signals to produce a combined signal, said combined signal including a relatively small sinusoidal signal resulting from a reflection of said RF signal from a surface of said material and a relatively large sinusoidal signal from a reflection of said RF signal from an opaque surface within said tank;

a low noise amplifier coupled to the mixer for amplifying the combined signal;

an anti-aliasing filter coupled to an output of the low noise amplifier for filtering the combined signal;

an analog-to-digital converter coupled to an output of the anti-aliasing filter for digitizing said combined signal to produce a digitized signal;

a frequency estimation processor for receiving the digitized signal, the frequency estimation processor including:

means for computing an autocorrelation matrix to provide an initial estimate of frequencies of the relatively large sinusoidal signal;

means for computing a cumulant matrix and using said cumulant matrix and said initial estimate of frequencies to provide a final estimate of said frequencies of the one relatively large sinusoidal signal, the final estimate including an estimate of amplitude and phase of said relatively large sinusoidal signal;

means for subtracting said final estimate of said relatively large sinusoidal signal from said digitized signal to obtain a residual;

means for processing said residual using a higher order statistics (HOS) algorithm to determine a frequency of said small sinusoidal signal from said residual; and means for determining the level of the material using said frequency of said small sinusoidal signal.

2. The apparatus of claim 1 wherein said means for estimating includes means for estimating said phase of said at least one relatively large sinusoidal signal by minimizing power in said residual.

3. The apparatus of claim 2 wherein said sweep frequency generator outputs only one ramp cycle.

4. A method for estimating a level of a material stored within a tank, comprising the steps of:

generating with a sweep frequency generator, an RF signal into said tank;

receiving, with an antenna, reflected RF signals;

mixing, with a mixer, said RF signal with said reflected RF signals to produce a combined signal, said combined signal including a relatively small sinusoidal signal resulting from a reflection of said RF signal from a surface of said material and a relatively large sinusoidal signal from a reflection of said RF signal from an opaque surface within said tank;

amplifying the combined signal with a low noise amplifier coupled to the mixer;

filtering the combined signal with an anti-aliasing filter coupled to an output of the low noise amplifier;

producing a digitized signal with an analog-to-digital converter coupled to an output of the anti-aliasing filter for digitizing said combined signal;

receiving the digitized signal with a frequency estimation processor, the receiving the digitized signal step including the steps of:

computing an autocorrelation matrix to provide an initial estimate of frequencies of the relatively large sinusoidal signal;

computing a cumulant matrix and using said cumulant matrix and said initial estimate of frequencies to provide a final estimate of said frequencies of the one relatively large sinusoidal signal, the final estimate including an estimate of amplitude and phase of said relatively large sinusoidal signal;

subtracting said final estimate of said relatively large sinusoidal signal from said digitized signal to obtain a residual;

processing said residual using a higher order statistics (HOS) algorithm to determine a frequency of said small sinusoidal signal from said residual; and determining the level of the material using said frequency of said small sinusoidal signal.

\* \* \* \* \*